United States Patent [19]

Horinouchi et al.

[11] Patent Number: 5,777,975
[45] Date of Patent: Jul. 7, 1998

[54] OPTICAL PICKUP INCORPORATING AN INTEGRATED OPTICAL GUIDE MEMBER

[75] Inventors: Syogo Horinouchi, Fukuoka; Shigeki Takeuchi, Yamaga; Hideki Yoshinaka, Omuta; Toshihiro Koga, Kurume; Kazuhiko Higo, Miyazaki; Hidehiro Kugisaki; Fumiaki Beppu, both of Omuta; Jiro Mimasa, Fukuoka, all of Japan

[73] Assignee: Matsushita Electric Industrial Co., Ltd., Osaka, Japan

[21] Appl. No.: 603,766

[22] Filed: Feb. 20, 1996

[30] Foreign Application Priority Data

Feb. 20, 1995  [JP]  Japan .................................. 7-031143

[51] Int. Cl.⁶ .................................................. G11B 7/00
[52] U.S. Cl. ........................... 369/112; 369/110; 369/103
[58] Field of Search ............................... 369/109, 110,
369/112, 116, 44.14, 44.11, 44.12, 100,
103, 118, 44.23, 44.24

[56] References Cited

U.S. PATENT DOCUMENTS

| 5,095,476 | 3/1992 | Greve et al. | 369/112 X |
|---|---|---|---|
| 5,189,655 | 2/1993 | Ogata et al. | 369/112 X |
| 5,200,946 | 4/1993 | Fritz | 369/112 |
| 5,272,685 | 12/1993 | Ando | 369/110 X |
| 5,488,592 | 1/1996 | Kim | 369/112 X |

FOREIGN PATENT DOCUMENTS 6-119675 A  4/1994  Japan .
6-203420 A  7/1994  Japan .

*Primary Examiner*—Paul W. Huber
*Attorney, Agent, or Firm*—Spencer & Frank

[57] ABSTRACT

A light source beam is incident on an optical guide block and converted in its diffusion angle by a diffusion angle conversion film on a second inclined portion of the optical guide block, and reflected by a reflecting film on a first inclined portion. Then, the light is incident on a first beam splitter film on the second inclined portion and split into transmitted light and reflected light. The reflected light is focused an optical disk light reflected from the disc passes through the first beam splitter film, and then is transmitted and reflected by a second beam splitter film on a third inclined portion. This transmitted light is incident on a polarization plane conversion plate between the third inclined portion and a fourth inclined portion, so that P and S polarization components and are transmitted through and reflected by its polarized light splitting portion, respectively. The S polarization component is reflected by its reflecting surface toward light-receiving elements. The reflected light from the second beam splitter film is reflected by a focus error detection element on the second inclined portion, and an incident light-splitting point of the polarized light splitting portion is located between the center of the optical guide block and the light-receiving elements, thereby reducing a light amount loss and also increasing a Kerr rotation angle so that an RF reproduction signal with a high C/N ratio can be obtained.

10 Claims, 19 Drawing Sheets

FIG. 21a
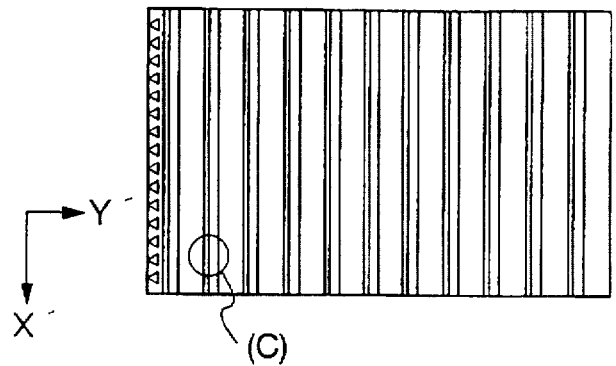
FIG. 21b
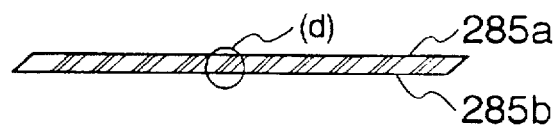
FIG. 21c    FIG. 21d
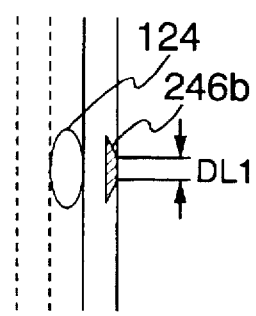 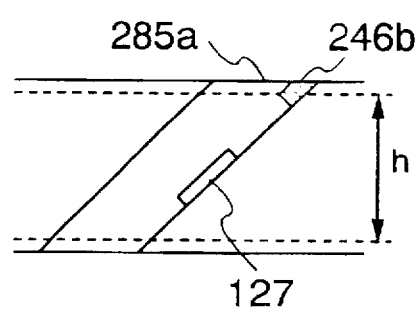
FIG. 21e
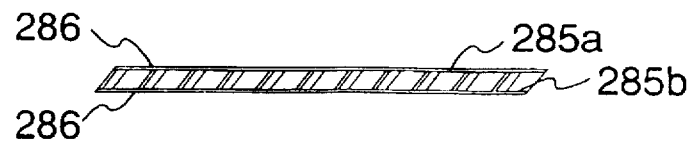

OPTICAL PICKUP INCORPORATING AN INTEGRATED OPTICAL GUIDE MEMBER

BACKGROUND OF THE INVENTION

This invention relates to an optical element or an optical pickup for recording and reproducing information on an optical disk, and also relates to a method thereof.

It has heretofore been desired to reduce the dimensions and the cost of an optical disk unit capable of recording and reproducing information using a laser beam, and accordingly, the number of optical components has been decreased in an attempt to achieve a compact, lightweight and low-cost design of an optical pickup, as disclosed in, for Example, Japanese Patent Unexamined Publication No. 6-203420 or Japanese Patent Unexamined Publication No. 6-119675. The optical pick-up device disclosed in either of these documents is provided with means for converting an incident polarization plane of an analyzer into an angle of about 45° with respect to an incident plane. In the conventional constructions, the incident polarization plane has been converted into an angle of about 45° using a ½ wavelength plate, or an analyzer-forming surface has been so arranged that the incident polarization plane was inclined at an angle of about 45° with respect to the incident plane.

However, the following problems have been encountered with the above conventional techniques:

Since the ½ wavelength plate is bonded parallel to a beam splitter film, the ratio of the volume of crystal to the overall size of a chip is high, resulting in high costs. In the case where the ½ wavelength plate is achieved at a zero-order phase, the thickness of a substrate is several tens of microns so that the handling can not be effected easily. In the case where two crystal plates, which have respective crystal axes orthogonal to each other, are joined together to achieve a zero-order phase, the ratio of the crystal volume to the overall chip size is also high, thus increasing the cost. With a bulk-type construction, a compact, lightweight design can not be achieved. Furthermore, in a method of producing such optical pickup elements (devices), since the number of the optical pickup elements produced from one assembly block is determined by the length of an optical guide member, and further, since it has an inclined surface, it is difficult to arrange the pickup elements of the same configuration in the direction of the width of the assembly block, which results in a low productivity.

SUMMARY OF THE INVENTION

In the present invention, noise components of the same phase except for an opto-magnetic signal are removed by differential amplification between the light-receiving sensors, and the light receiving sensors can detect only an RF signal among others during their detection, and the two light-receiving sensors do not need to be split into two parts, thereby eliminating a light amount loss due to a dead zone between the two parts. By increasing an apparent Kerr rotation angle, an RF reproduction signal with a high C/N ratio can be obtained.

Even if the quantity ratio of P polarized- and S-polarized components of return light from an optical disk varies due to birefringence, the Kerr rotation or the like, a focus error signal will not be subjected to offset. In the case where a tracking error signal is detected by a 3-beam detection process, the size of a spot on each of the sensors can be made to be small, and therefore the development of crosstalk between a main beam and side beams can be suppressed.

Light with a small diffusion angle or generally parallel rays of light can be obtained by NA conversion, and variations in the angle of incidence of light on a polarization beam splitter, a polarized light-splitting portion or the like can be made to be small, and therefore optical characteristics can be easily controlled.

Incident light on condensing means has an ideal spherical wave, and therefore an image spot on the optical disk is condensed to the diffraction limit so as to have an ideal size, and thus, the recording and reproduction of the information can be effected easily.

With the provision of NA conversion means in two stages, the aspect ratio of the light incident on the condensing means can be made to be different from the aspect ratio of light emitted from an light-emitting element. Thus, elipticity of the image spot on the optical disk is reduced, thereby suppressing the degrading of the C/N ratio due to crosstalk of the optomagnetic signal from the adjacent pit rows.

Optical function elements are packaged on each of glass substrates or plates with the effective use of photolithography, film-forming technique or an etching technique, and the thus packaged glass substrates are bonded together to form an assembly, and with the provision of a plurality of the assemblies which are then bonded together, an assembly structure can be finally obtained, and then, the assembly structure is cut obliquely relative to bonding surfaces of the assemblies to provide a planar block. Afterward, the planar block is finally cut to provide optical elements or optical pickups which have conventional functions, and which have a compact and lightweight design. With this method, the time and labor required for production can be reduced, and productivity can be enhanced.

BRIEF DESCRIPTION OF THE DRAWINGS

FIGS. 21a to 21e are views for enplaning the formation of a planar block according to the present invention;

DESCRIPTION OF THE PREFERRED EMBODIMENTS

A first embodiment of the present invention will now be described with reference to the drawings.

Figure 1A:
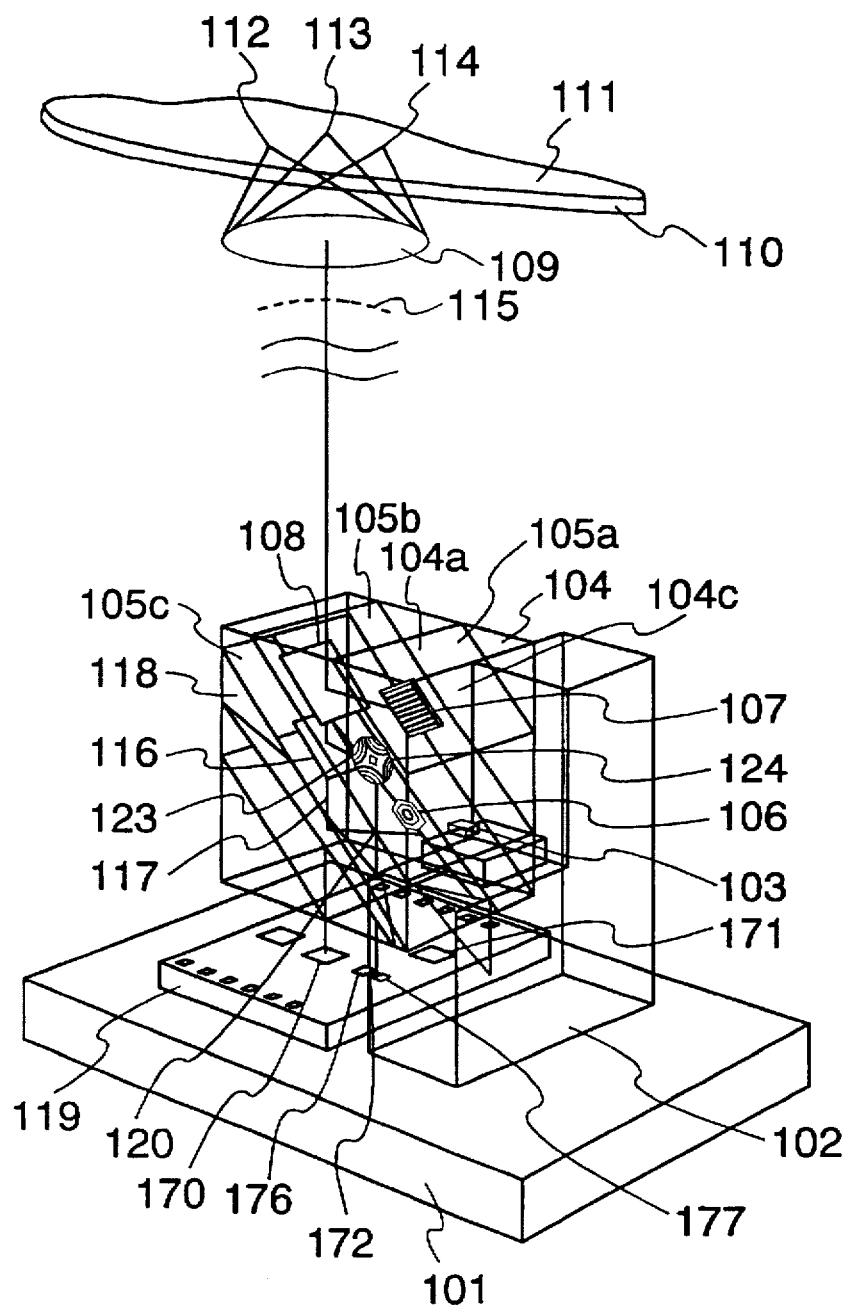
FIGS. 1a and 1b are a perspective view and a side-elevational view illustrating an optical pickup in a first embodiment of the present invention, respectively.
Figure 1B:
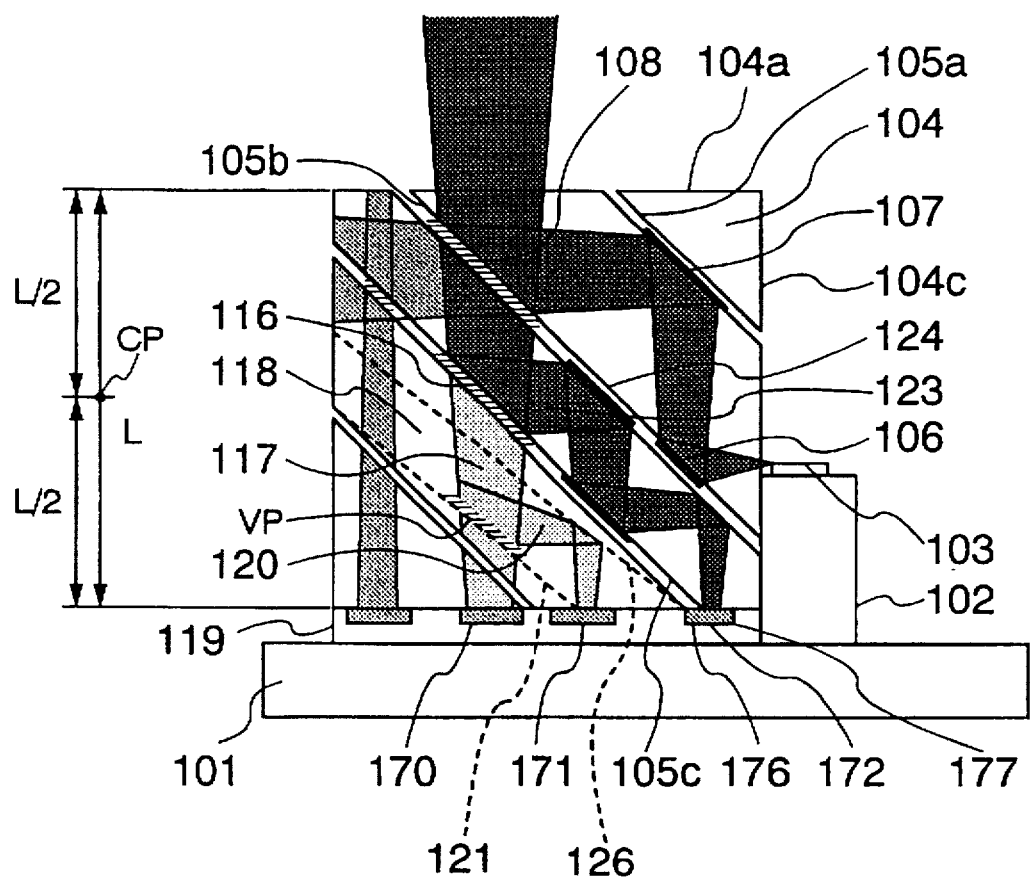
Figure 2:
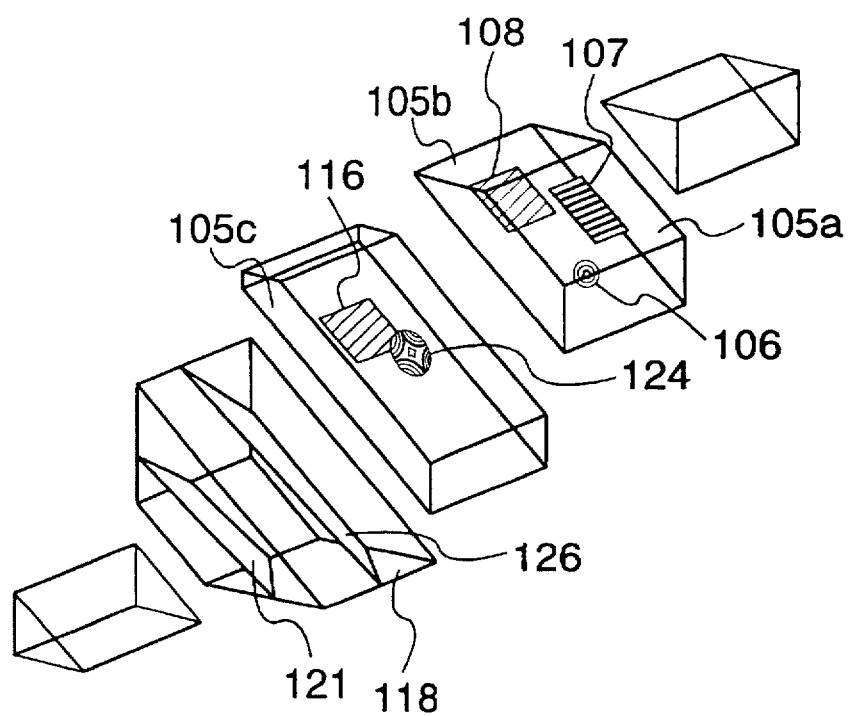
FIG. 2 is an exploded, perspective view illustrating the optical pickup in the first embodiment of the present invention.

FIGS. 1a and 1b are a perspective view and a side-elevational view which show an optical pickup in a first embodiment of the invention, and FIG. 2 is an exploded, perspective view of this optical pickup.

Referring to FIG. 1a, a laser beam, emitted horizontally from a semiconductor laser chip 103 mounted horizontally on a base plate 101 through a sub-mount 102, is incident on a surface 104c of an optical guide member 104 having a plurality of parallel inclined surfaces, and enters the optical guide member 104, and reaches a NA conversion hologram 106 of the reflective type formed on a second surface 105b of the optical guide member 104. This hologram 106 has the function of converting a diffusion angle of light (hereinafter referred to as "conversion of NA"). The light beam subjected to the conversion of NA and reflected by the NA conversion hologram 106, is split into a zero-order diffraction component (hereinafter referred to as the "main beam") and ±1 order diffraction components (hereinafter referred to as "side beams") by a diffraction grating 107 of the reflective type formed on a first surface 105a. The main beam and the side beams, formed by the diffraction grating 107, are incident on a first beam splitter film 108 having polarization selectivity (hereinafter referred to as the "first polarization beam splitter film"). A part of the light which is incident on the first polarization beam splitter film 108, and which is transmitted through this film 108, is used as monitor light for the light emitted from the semiconductor laser chip 103. The main beam and the side beams, reflected by the first polarization beam splitter film 108, are transmitted through a first surface 104a of the optical guide member 104, and pass through an objective lens 109 having a condensing effect so as to form image spots on an information recording surface 111 of an optical disk 110. At this time, image spots 112 and 114 of the two side beams are located substantially symmetrically with respect to each other about an image spot 113 of the main beam on the information recording surface 111. The recording of information on the information recording surface 111, and the reading of a reproduction signal and servo signals for tracking and focusing from the information recording surface 111, are effected using the image spot 113 of the maim beam and the image spots 112 and 114 of the side beams.

The NA conversion hologram 106 converts the diffusion angle of the light beam (which is emitted from the semiconductor laser chip 103) which can be incident on the NA conversion hologram 106, so that this hologram 106 can freely adjust the diffusion angle of the reflected light from this hologram 106. The NA conversion hologram 106 can convert the light into parallel rays of light having no diffusion angle at all. The NA conversion hologram 106 has such a function that the light beam, going out of the optical guide member 104, can compensate the light beam for wave aberrations accumulated on the path so that the light beam has an ideal spherical wave 115. Therefore, the light beam incident on the objective lens 109 has the ideal spherical wave 115, and the image spot, converged on the optical disk 110 by the objective lens 109, can substantially have a diffraction limit size, that is, an ideal size, so that the information can be easily recorded and reproduced.

The diffusion angle of the light which is emitted from the semiconductor laser chip and which can be incident on the NA conversion hologram 106, is represented by $\theta 1$, and the diffusion angle of the outgoing light from the NA conversion hologram 106 is represented by $\theta 2$. It is preferred that the diffusion angle $\theta 1$ of the light incident on the NA conversion hologram 106 should be large so that there can be achieved a high light-utilizing efficiency (that is, the ratio of the light amount, required for the image formation, to the total amount of the light emitted from the semiconductor laser chip) necessary for the reproduction of the information. Its lower limit is expressed by the following formula:

$$\sin \theta 1 > 0.18$$

If the diffusion angle $\theta 1$ is increased too much, the effective area of the NA conversion hologram 106 must be increased, and the diameter of the light beam is increased after the NA conversion, and the diameters of all of the light beams going all the way to a sensor base plate 119 are increased. As a result, the optical system can not be constructed properly. The upper limit thereof is expressed by the following formula:

$$\sin \theta 1 < 0.3$$

On the other hand, the light is incident on the first and second polarization beam splitters, polarized light-splitting portions and so on with angles which are generally equal to the diffusion angle $\theta 2$ of the outgoing light from the NA conversion hologram 106, and therefore it is preferred that the diffusion angle $\theta 2$ should be small so that the optical phase at the polarization beam splitters and the polarized light-splitting portions can be controlled easily. Its upper limit is expressed by the following formula:

$$\sin \theta 2 < 0.17$$

Furthermore, the light reaches the objective lens 109 with the diffusion angle generally equal to the diffusion angle θ2 of the outgoing light from the NA conversion hologram 106, and therefore the magnification of the objective lens 109 is limited by the diffusion angle θ2. If the diffusion angle θ2 is too small, the object and image distance of the objective lens 109 is increased, and the distance between the optical guide member 104 and the objective lens 109 becomes large, so that the overall size of the optical system is increased. Its lower limit is expressed by the following formula:

$$\sin θ2 > 0.06$$

Therefore, it is preferred that the NA conversion hologram 106 is so designed that the light emitted from the semiconductor laser chip can satisfy the following formulas:

$$0.18 < \sin θ1 < 0.3$$

$$0.06 < \sin θ2 < 0.17$$

More preferably, the NA conversion hologram 106 is so designed that the light emitted from the semiconductor laser chip can satisfy the following formulas:

$$0.18 < \sin θ1 < 0.23$$

$$0.09 < \sin θ2 < 0.15$$

The return light, consisting of the main beam and the side beams reflected by the information recording surface 111 of the optical disk 110, again passes through the objective lens 109 and the first surface 104a of the optical guide member 104, and is again incident on the first polarization beam splitter film 108 formed on the second surface 105b of the optical guide member 104. The first beam splitter film 108 has substantially 100% transmittance for light having a vibration component parallel to the plane of incidence (hereinafter referred to merely as the "P polarization component"), and also has a predetermined reflectance for light having a vibration component perpendicular to the plane of incidence (hereinafter referred to merely as the "S polarization component").

That portion of the light (from the optical disk 110) transmitted through the first polarization beam splitter film 108 is incident on a second beam splitter film 116 having polarization selectivity (hereinafter referred to as the "second polarization beam splitter film"), the second polarization beam splitter film 116 being formed on a third surface 105c of the optical guide member 104 parallel to the first surface 105a. (The second polarization beam splitter film 116, like the first polarization beam splitter film 108, has substantially 100% transmittance for the P polarization component, and a predetermined reflectance for the S polarization component.)

Of the light beam which is incident on the second polarization beam splitter film 116, that portion (that is, transmitted light 117) which is transmitted through the second polarization beam splitter film 116 will be explained. The transmitted light 117 is incident on a polarization plane conversion plate 118 bonded to the third surface 105c.

Figure 3:
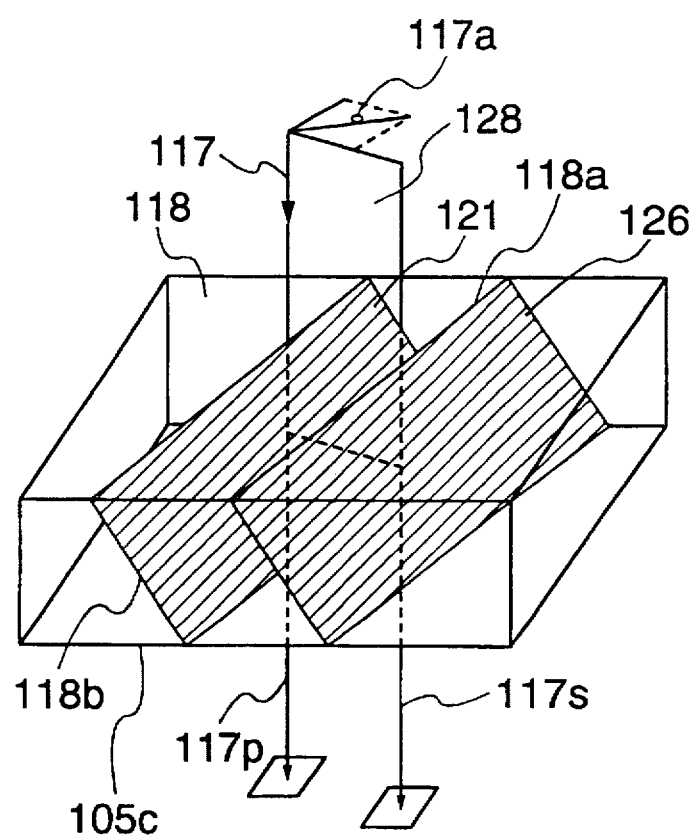
FIG. 3 is a perspective view illustrating a polarization plane conversion substrate in the first embodiment of the invention.

FIG. 3 is a perspective view of the polarization plane conversion plate 118 of the invention. The polarization plane conversion plate 118 has a first inclined surface (hereinafter simply referred to as the "first other inclined surface") 118a, and a second inclined surface (hereinafter referred to as the "second other inclined surface") 118b parallel to the first other inclined surface 118a. A reflecting film 126 is formed on the first other inclined surface 118a, and a polarized light splitting film 121 is formed on the second other inclined surface 118b. The transmitted light 117 is incident on the polarized light splitting film 121 formed on the second other inclined surface 118b. The second other inclined surface 118b is so formed that the angle between a polarization plane 117a of the transmitted light 117 and a plane 128 of incidence thereof is about 45° (2n+1 where n is an integer). As a result, the intensity ratio of a P polarization component 117P of the transmitted light 117 to an S polarization component 117S thereof is substantially 1:1. The P polarization component 117P, having a polarization component parallel to the incidence plane 128, transmits substantially 100% through the polarized light splitting film 121, whereas the S polarization component 117S, having a polarization component perpendicular to the incidence plane 128, is reflected substantially 100% by the polarized light splitting film 121 formed on the second other inclined surface 118b, then is incident on the first other inclined surface 118a and then is reflected by the reflecting film 126 to a light-receiving element.

As shown in FIG. 1b, a point VP on the polarized light splitting film 121 at which the transmitted light 117 is split into the P polarization component 117P and the S polarization component 117S is located off from the center CP of the optical guide member 104 to the base plate 101. With this arrangement in which the light is split into the P and S polarization components at the region relatively near to the base plate 101, the size of the optical guide member 104 can be reduced, and besides a margin for machining the polarization plane conversion plate can be increased, which is very useful. More preferably, it is preferable that the point VP is off from a mid point (spaced by a distance ¼ L from the base plate 101) between the center CP and the base plate 101 to the base plate 101.

Next a detailed explanation will be made of an optomagnetic signal detection principle with reference to FIGS. 4 to 6. There is provided an enhancing construction for amplifying an apparent Kerr rotation angle θk so as to obtain a RF reproduction signal of good quality and also to increase the C/N ratio. Referring now to FIG. 5, the arrow 150 indicates the direction of polarization of linearly-polarized light which is incident on the polarized light splitting film 121 in the case of no information recorded on the information recording surface 111 of the optical disk 110, as described above. When the linearly polarized light 150 is reflected upon magnetized information pits on the optical disk 110, the Kerr rotation angle varies in the range of ±θk depending on the polarity and magnitude of the magnetization (Kerr effect). θk is the so-called Kerr rotation angle. In the figure, a linearly polarized light 151 is obtained by rotating the linearly polarized light 150 by an angle θk, and linearly polarized light 152 is obtained by rotating the linearly polarized light 150 by an angle of −θk. The return light from the optical disk 110 transmits through the first surface (upper surface) 104a of the optical guide member 104, and then is incident on the first polarization beam splitter film 108 formed on the second surface 105b. The first polarization beam splitter film 108 has the predetermined reflectance for the S polarized-light, and also has substantially 100% transmittance for the P polarized light. Therefore, with respect to the linear polarization direction in FIG. 5, the linearly polarized light 151, rotated by θk, is brought into θk' rotated-condition as at 153, and the linearly polarized light 152, rotated by −θk, is brought into a −θk' rotated-condition as at 154, so that the apparent Kerr rotation angle θk is increased. The same occurs with the light 120 transmitted through the second polarization beam splitter film 116 formed on the third surface 105c, and with respect to the linear polarization direction, the linearly polarized light 153, rotated by θk', is brought into a θk" rotated-condition as at 155, and the linearly polarized light 154, rotated by −θk', is brought into a −θk" rotated-condition as at 156, so that the apparent Kerr rotation angle is further increased. This construction for thus increasing the apparent Kerr rotation angle θk is generally called an enhancing construction.

Therefore, with respect to the transmitted light 117 to be incident on the polarized light splitting film 121, the apparent Kerr angle has already been increased from θk to θk". FIG. 6 is a diagram showing the condition of polarization in the polarized light splitting film 121 shown in FIG. 3.

Figure 6:
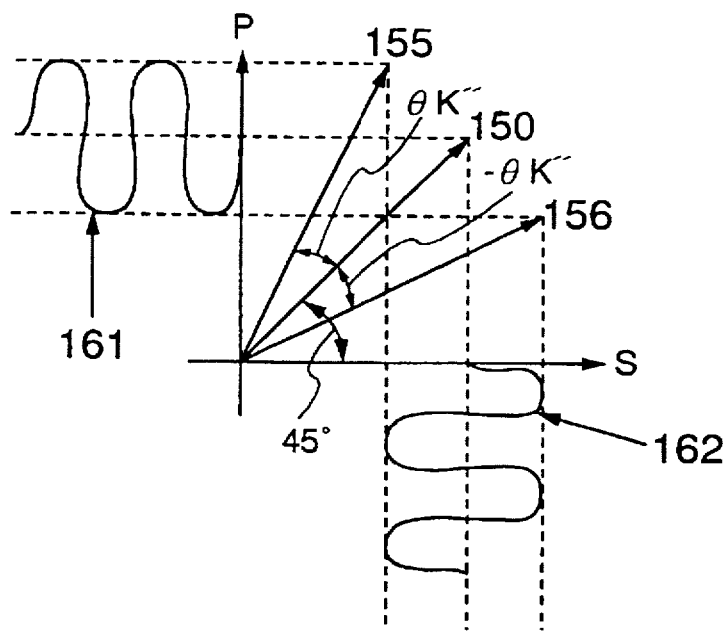
FIG. 6 is a view illustrating a condition of polarization in a polarized light splitting film in the first embodiment of the present invention.

In FIG. 6, linearly polarized light 155 is obtained by rotating the linearly polarized light 150 by θk", and linearly polarized light 156 is obtained by rotating the linearly polarized light 150 by −θk". When the opto-magnetic signal, modulated from the linearly polarized light 155 to the linearly polarized light 156, is incident on the polarized light splitting film 121, a signal 161 of the P polarization component is received by a light-receiving sensor 170, and a signal 162 of the S polarization component is received by a light-receiving sensor 171. The RF reproduction signal has a component which is double by obtaining the differential between the signal 161 of the P polarization component and the signal 162 of the S polarization component, that is, the differential between the signal of the light-receiving sensor 170 and the signal of the light-receiving sensor 171, since the two are out of phase with each other by π, and also noises are cancelled by this differential since they are of the same phase. As a result, a high C/N ratio can be obtained.

In the photoelectric current detected by the first light-receiving sensor 170 is denoted by I170, and the photoelectric current detected by the second light-receiving sensor 171 is I171, denoted by this the RF signal (R. F.) is expressed by the following formula:

R. F.=I170−I171

Next, an explanation will be presented of reflected light 123 (see FIG. 1) obtained from the light beam incident on the second polarization beam splitter film 116. The reflected light 123 is incident on an astigmatism-generating hologram 124 of the reflective type formed on the second surface 105b. The reflected light 123 is reflected by the astigmatism-generating hologram 124 while producing astigmatism, and the return light of the main beam reaches a light-receiving sensor 172 on the sensor base plate 119 while the return light beams of the side beams reach light-receiving sensors 176 and 177 on the sensor base plate 119, respectively.

The detection of the focus error signal by an astigmatism method, as well as the condition of the astigmatism in this embodiment, will now be descried in further detail with reference to FIG. 4 and FIGS. 7a to 7f.

Figure 7A:
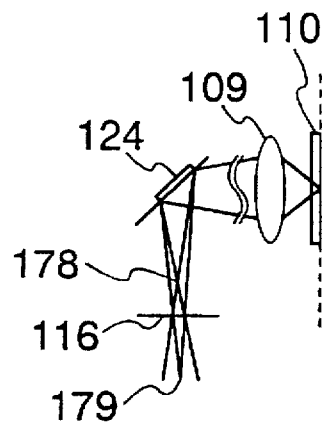
FIGS. 7a to 7f are views for explaining a focus error signal detection principle by an astigmatism process in the optical pickup according to the present invention.
Figure 7B:
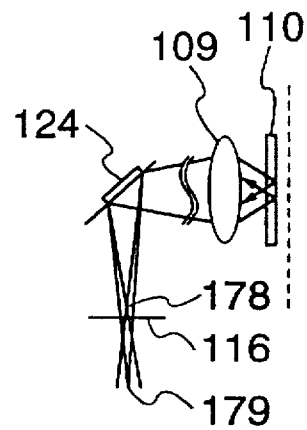
Figure 7C:
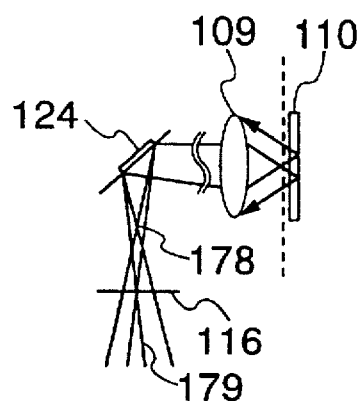
Figure 7D:
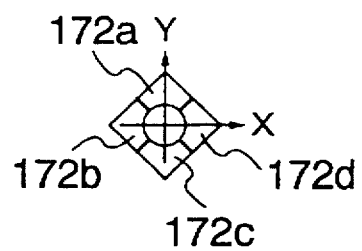
Figure 7E:
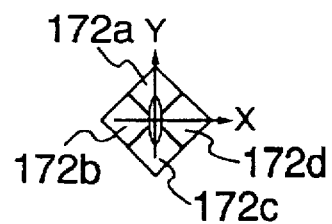
Figure 7F:
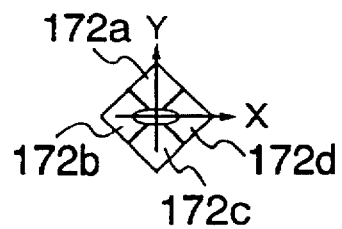

FIGS. 7a to 7c show the astigmatic light beam, and more specifically these Figures show a condition in which the optical disk 110 is at the focal position, a condition in which the optical disk 110 is off from the focal position inward, and a condition in which the optical disk 110 is off from the focal position outward, respectively. FIGS. 7d to 7f show the configurations of the light spot, formed by the astigmatism-generating hologram 124 on light-receiving sensors 172a, 172b, 172c and 172d, the spot configurations of FIGS. 7d to 7f corresponding to the conditions of FIGS. 7a to 7c, respectively.

When the optical disk 110 is located in the focal position, the astigmatism-generating hologram 124 produces a first focus 178 upstream of the light-receiving sensor 172, and produces a second focus 179 downstream of the light-receiving sensor 172. If expressed in terms of an x-axis direction and a y-axis direction as shown in FIGS. 7d to 7f, a linear image in the y-axis direction is formed at the position of the first focus 178, and a linear image is formed on the x-axis at the position of the second focus 179. The astigmatism-generating hologram 124 is so designed that when the optical disk 110 is located at the focal position, the diameters of the spot (produced by the astigmatism) in the x-axis and y-axis directions are equal to each other, so that the spot has a circular shape.

Photoelectric currents I172a, I172b, I172c, I172d are outputted respectively from the light-receiving sensors 172a, 172b, 172c and 172d. The focus error signal can be expressed by the following formula as will be appreciated from the circuit diagram of FIG. 4:

F. E.=(I172a+I172c)−(I172b+I172d)

When the optical disk 110 is located in the focal position, the diameters of the spot in the x-axis and y-axis directions are equal to each other so that the spot has a circular shape as can be seen in FIGS. 7a to 7d, and therefore the sum of the amounts of the light received respectively by the sensors 172a and 172c is equal to the sum of the amounts of the light received respectively by the sensors 172b and 172d so that the focus error signal is expressed by the following formula:

F. E.=0

When the optical disk 110 is off from the focal position inward, the first focus 178 and the second focus 179, which are produced by the astigmatism-generating hologram 124, are further from the astigmatism-generating hologram 124 as shown in FIG. 7b, so that the spot on the light-receiving sensors 172a, 172b, 172c and 172d is formed into an oval light beam having a major axis in the y-axis direction as shown in FIG. 7e. As a result, the amount of the light received by the light-receiving sensors 172a and 172c is larger than the amount of the light received by the light-receiving sensors 172b and 172d, and the focus error signal is expressed by the following formula:

F. E.>0

When the optical disk 110 is off from the focal position outward, the first focus 178 and the second focus 179, which are produced by the astigmatism-generating hologram 124, are closer to the astigmatism-generating hologram 124 as shown in FIG. 7c, so that the spot on the light-receiving sensors 172a, 172b, 172c and 172d is formed into an oval light beam having a major axis in the x-axis direction as shown in FIG. 7f. As a result, the amount of the light received by the light-receiving sensors 172b and 172d is larger than the amount of the light received by the light-receiving sensors 172a and 172c, and the focus error signal is expressed by the following formula:

F. E.<0

The above focus error detection method is known as an astigmatism method.

The tracking detection method will now be described with reference to FIG. 4 and FIGS. 8a to 8c.

Figure 8A:
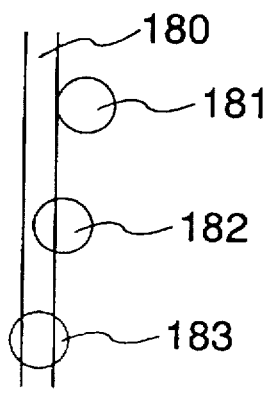
FIGS. 8a to 8c are views showing a tracking error signal detection principle by a 3-beam method in the optical pickup according to the present invention.
Figure 8B:
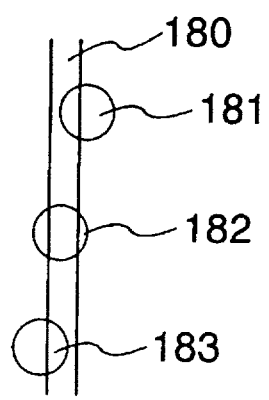
Figure 8C:
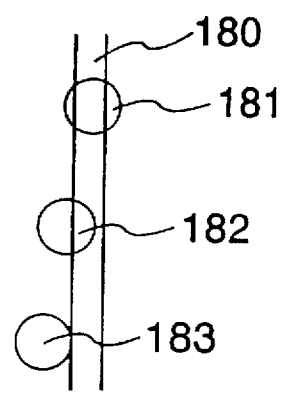

FIG. 8 shows the positional relation between the image spots formed on the optical disk and an information track 180 on the optical disk. Image spots 181 and 183 of the two side beams are located symmetrical with each other about an image spot 182 of the main beam in the direction of the track, and are offset respectively in opposite directions slightly with respect to the information track 180, as shown in FIG. 8b. Light beams from the side beam spots 181 and 183 in FIGS. 8a to 8c reach the light-receiving sensors 176 and 177 on the sensor base plate 119, respectively, along similar optical paths as described above for the astigmatism process, thereby forming spots 184 and 186, respectively. In FIG. 8, photoelectric currents I176, I177 are produced respectively from the light-receiving sensors 176 and 177 at this time. When the information track 180 is deviated left with respect to the image spot 182 of the main beam as shown in FIG. 8a, the image spot 183 of the side beam is located substantially just on the information track 180 so that the intensity of the reflected light thereof decreases. On the other hand, the image spot 181 of the side beam is deviated from the information track 180, and accordingly, the reflected light thereof increases. In contrast, when the information track 180 is deviated right with respect to the image spot 182 as shown in FIG. 8c, a phenomenon reverse to the foregoing occurs, and more specifically, the amount or intensity of the reflected light of the image spot 181 decreases while the amount of the reflected light of the image spot 183 increases.

Figure 4:
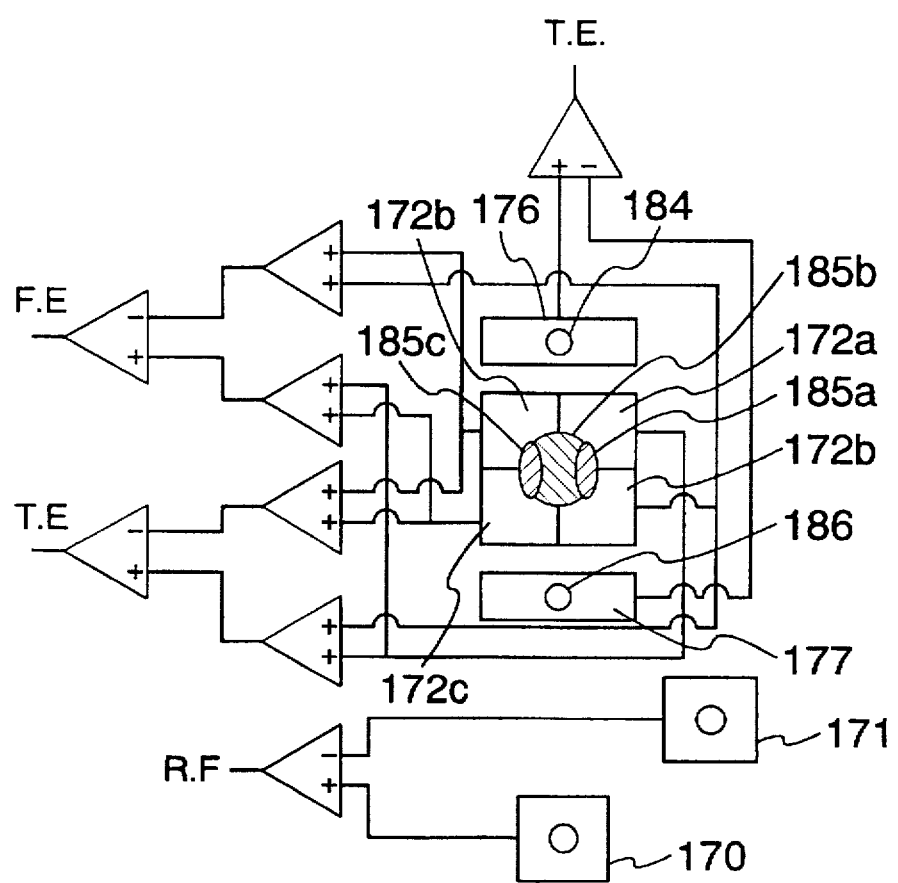
FIG. 4 is a view illustrating the arrangement of light-receiving sensors, and a signal processing circuit in the first embodiment of the present invention.
Figure 5:
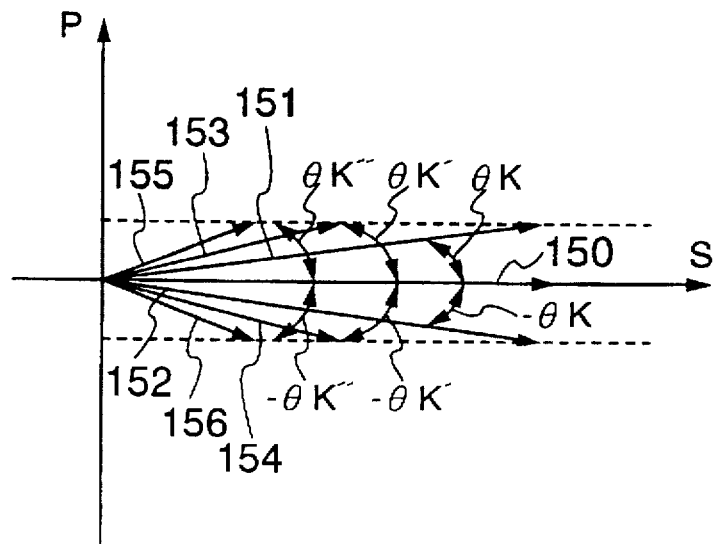
FIG. 5 is a view for explaining an optomagnetic signal detection principle in the optical pickup according to the present invention.

Therefore, as will be appreciated from the circuit diagram of FIG. 4, the tracking error signal (T. E.) can be obtained if the circuit is so designed as to satisfy the following formula:

$$T.E.=I176-I177$$

The above tracking error signal detection method is known as a 3-beam method.

A push-pull method may be used as a tracking detection method.

In this embodiment, although the NA conversion hologram 106 of the reflective type and the astigmatism-generating hologram 124 of the reflective type are used, reflecting lenses achieving similar effects can be used instead of these holograms.

In this embodiment, although the focus error signal is obtained by the astigmatism method using the astigmatism-generating hologram 124, there may be used, instead of the astigmatism-generating hologram 124, a reflective-type hologram or a reflective-type lens with one or more patterns which causes the reflected light 123 from the second polarization beam splitter film 116 to form an image on the sensor base plate 119 so as to obtain the focus error signal by a knife-edge method or a Foucault method.

Figure 9:
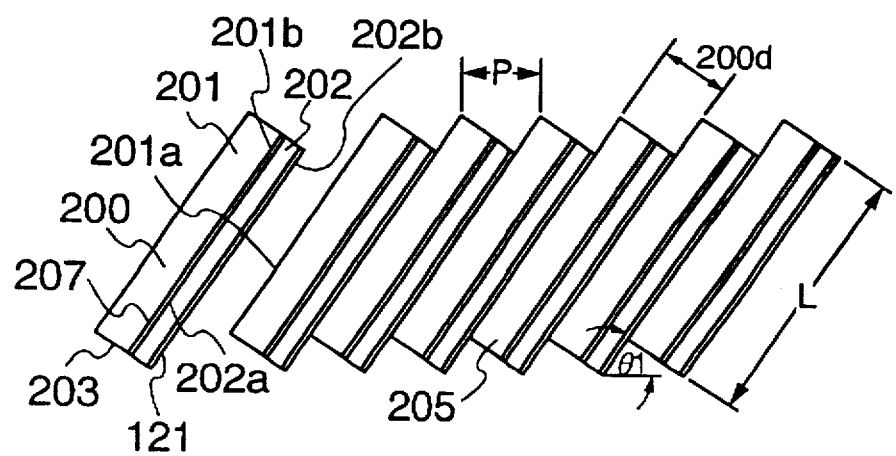
FIG. 9 is a view illustrating a composite block for a polarization plane conversion plate in the optical pickup according to the present invention.

A method of producing the polarization plane conversion plate 118 of the first embodiment will now be described with reference to FIGS. 9 and 10. First, referring to FIG. 9, reflecting film 207 is formed on a second surface 201b of a first optical guide member 201 while a polarized light splitting film 121 is formed on a second surface 202b of a second optical guide member 202, and the second surface 201b of the first optical guide member 201 and a first surface 202a of the second optical guide member 202 are bonded together by means of an adhesive 203 to form a polarization plane conversion plate assembly block (hereinafter referred to merely as "conversion assembly block") 200. A plurality of conversion assembly blocks 200 thus formed are bonded together to form a polarization plane conversion plate composite block (hereinafter referred to merely as "conversion composite block") 205 in such a manner that the first surface 201a of the first optical guide member 201 of each conversion assembly block 200 is bonded to the second surface 202b of the second optical guide member 202 of the adjacent conversion assembly block 200 by means of the adhesive 203, with the adjacent conversion assembly blocks 200 being inclined at an angle of θ1. FIG. 9 shows the appearance of the conversion composite block 205.

Figure 10:
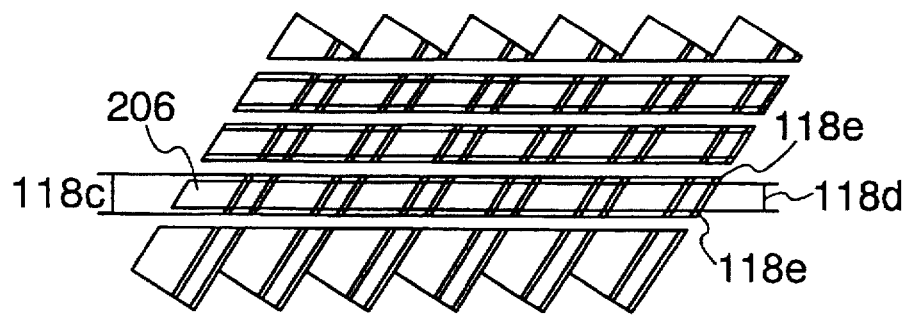
FIG. 10 is a view illustrating a condition in which the composite block for the polarization plane conversion plate is cut.

FIG. 10 shows a condition in which polarization plane conversion plate planar blocks (hereinafter referred to merely as "conversion planar block") 206 are cut from the conversion composite block 205, the conversion planar block 206 having a thickness 118c which is obtained by adding a thickness 118d (corresponding to the thickness of the polarization plane conversion plate 118 in its final form) thereto with thicknesses 118e (corresponding to the amount of lapping to be effected). The number of the conversion planar blocks 206 to be formed from the conversion composite block 205 is determined by a dimension L of the first and second optical guide members 201 and 202.

A thickness 200d of the conversion assembly block 200 can be determined to be equal to a pattern pitch P (see FIG. 9) in a wafer process (described later), and the number of the conversion assembly blocks 200 to be bonded together can be increased in accordance with the size of wafers to be produced, thereby increasing the size of the conversion planar block 206. By doing so, the number of chips to be produced in the wafer process can be easily increased. The reflecting film 207 and the polarized light splitting film 121 may be formed on each of the opposite surfaces of each of the optical guide members 201 and 202, and such conversion assembly blocks 200 are bonded together to form a modified composite block 205.

For forming the optical guide member 104 of this embodiment, three parallel flat plates and one conversion planar block 206 are bonded together through the intermediary of adhesive layers to form an assembly block, and a plurality of thus formed assembly blocks are bonded together through adhesive layers to form a composite block, and the composite block is cut obliquely with respect to the bonding surfaces of the assembly blocks to provide a planar block. Bar blocks are formed from this planar block, and the optical guide member 104 in each of these embodiments is formed from this bar block by cutting.

Figure 11:
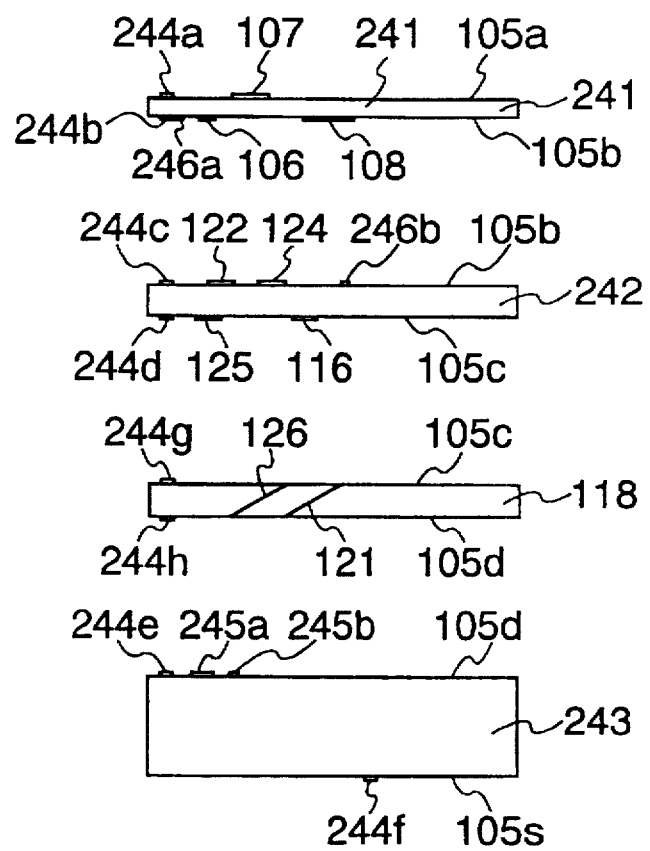
FIG. 11 is a view illustrating elements mounted on the optical pickup element (device)
Figure 12:
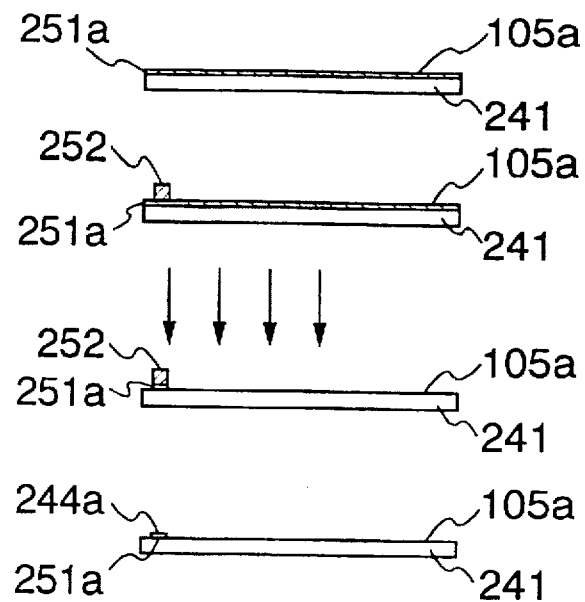
FIG. 12 is a view for explaining the formation of a bonding position-registration marker according to the present invention.
Figure 13:
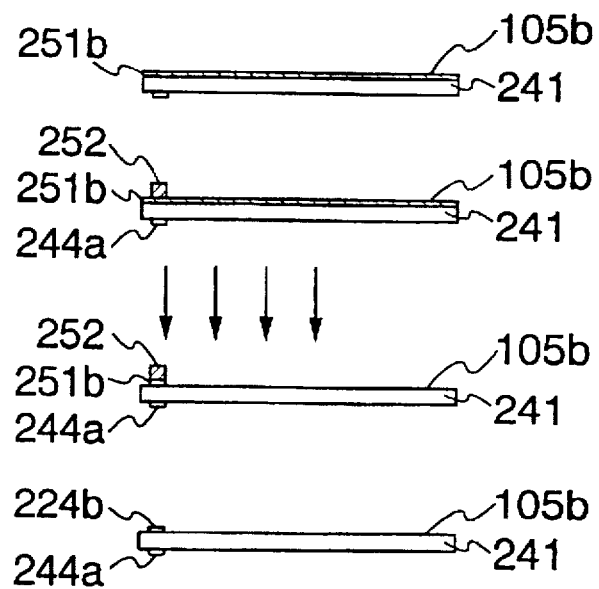
FIG. 13 is a view for explaining the formation of a bonding position-registration marker according to the present invention.

A method of manufacturing the three plates for constituting the assembly block in the formation of the optical guide member 104 of this embodiment will now be described with reference to FIGS. 11 to 18. FIG. 11 shows elements mounted on the optical pickup element of the first embodiment.

The reflective-type diffraction grating 107 and a first bonding position-registration marker 244a are formed on a first surface 105a of the first plate 241. The NA conversion hologram 106, a first depth marker 246a, the first polarization beam splitter film 108 and a second bonding position-registration marker 244b are formed on a second surface 105b of the first plate 241. The reflecting film 122, a second depth marker 246b, the reflective-type astigmatism-generating hologram 124 and a third bonding position-registration marker 244c are formed on a first surface 105b of the second plate 242. The second polarization beam splitter film 116, a reflecting film 125 and a fourth bonding position-registration marker 244d are formed on a second surface 105c of the second plate 242. A fifth bonding position-registration marker 244e, a first cutting marker 245a and a second cutting marker 245b are formed on a first surface 105d of the third plate 243. A sixth bonding position-registration marker 244f is formed on a second surface 105s of the third plate 243. A seventh bonding position-registration marker 244g is formed on a first surface 105c of the polarization plan conversion plate 118, and an eighth bonding position-registration marker 244h is formed on a second surface 105d of the polarization plane conversion plate 118.

A method of forming each of the optical function elements to be mounted on the respective plates will now be described. The formation of the first bonding position-registration marker 244a will be described with reference to FIG. 12. A first marker-forming material 251a for the first bonding position-registration marker 244a is formed on the first surface 105a by a vacuum film-forming device. The first marker-forming material 251a for the first bonding position-registration marker 244a is a metal material such as Ti, Cr, Cu, Au, Ag, Ta or Al. It is particularly preferred from the viewpoints of the cost and the time and labor that the first marker-forming material 251a is a material capable of wet type etching. In this embodiment, a Ti film is used. A pattern 252 for the first bonding position-registration marker 244a is formed by photolithography, and then the side etching of the pattern is suppressed by wet type spray etching, and that portion except for the pattern is removed, and the pattern 252 is removed, thereby forming the first bonding position-registration marker 244a. Next, a method of forming the second bonding position-registration marker 244b will be described with reference to FIG. 13. A second marker-forming material 251b for the second bonding position-registration marker 244b is formed on the second surface 105b by a vacuum film-forming device. Preferably, the second marker-forming material 251b is capable of etching, and is a metal material such as Ti, Cr, Cu, Au, Ta or Al. In this embodiment, a Cr film is used. An etchant for the Cr film used in this embodiment is composed of 17g of cerium ammonium nitrate, 5 cc of perchloric acid and 100 cc of pure water. The Cr etchant can etch the Cr film without etching the Ti film, and therefore the process can be continued without damaging the first bonding position-registration marker 244a. The second bonding position-registration marker 244b must be formed, using the first bonding position-registration marker 244a as a reference. For pattern exposure, a pattern 252 for the second bonding position-registration marker 244b is formed by photolithography using a double-sided mask aligner. That portion except for the pattern is removed by wet type spray etching, and then the pattern 252 is removed, thereby forming the second bonding position-registration marker 244b. Although the wet type etching is used in this embodiment, the process can be carried out using a dry etching technique less liable to cause the side etching, such as ion milling etching or reactive etching. Also, the pattern may be formed by a lift-off process.

The method of forming the third, fifth and seventh bonding position-registration markers 244c, 244e and 244g (FIG. 11) is the same as the method of forming the first bonding position-registration marker 244a. The method of forming the fourth and sixth bonding position-registration markers 244d and 244f (FIG. 11) is the same as the method of forming the second bonding position-registration marker 244b.

Figure 14:
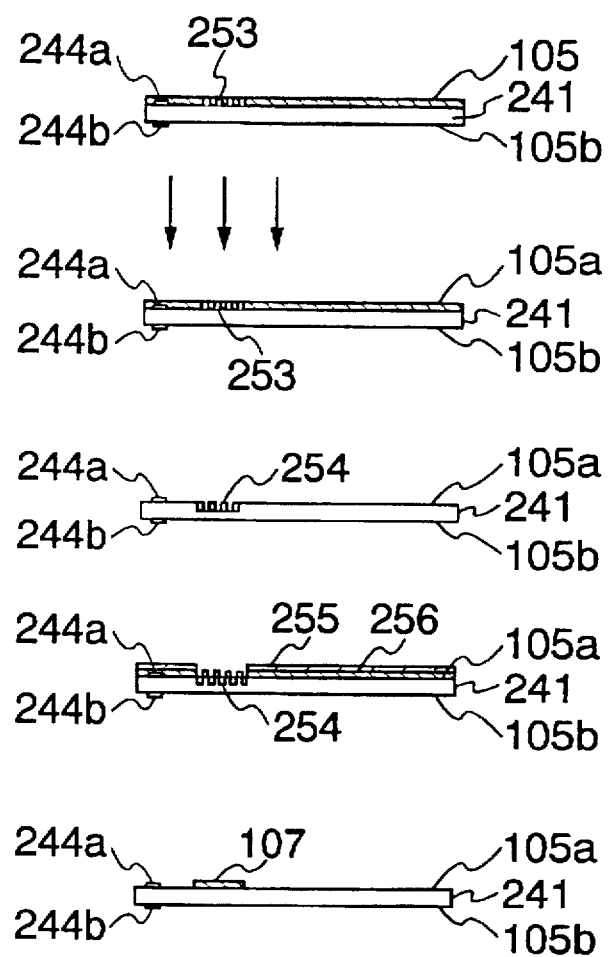
FIG. 14 is a view for explaining the formation of a reflective-type diffraction grating according to the present invention.

A method of forming the reflective-type diffraction grating 107 on the first surface 105a of the first plate 241 will be described with reference to FIG. 14. Using the first bonding position-registration marker 244a as a reference marker, a diffraction grating pattern 253 for the reflective-type diffraction grating 107 is formed on a predetermined portion of the first surface 105a by photolithography. Etching is made into a predetermined depth using a reactive etching process or an ion milling etching process. After the etching is completed, the diffraction grating pattern 253 is removed by oxygen plasma asher or an organic solvent, thereby a diffraction grating 254 is formed on the first surface 105a of the first plate 241. Further, a diffraction grating reflecting film pattern 256 is formed so as to form a reflecting film 255 on the diffraction grating 254 by a lift-off process. A negative-type photoresist is used for the diffraction grating reflecting film pattern 256 so that the pattern can have a reversely-tapering configuration in order to facilitate the lift-off. Alternatively, the pattern is formed by using a photoresist of the negative-positive inverted type, typical example of which is AZ-5218E manufactured by Hoechst Co. In this embodiment, the diffraction grating reflecting film pattern 256 is formed by using AZ-5218E of Hoechst Co. After the diffraction grating reflecting film pattern 256 is formed, the reflecting film 255 for the reflective-type diffraction grating 107 is formed by a vacuum film-forming device. Here, this film is formed by vacuum vapor deposition. The reflecting film 255 of the reflective-type diffraction grating is made of metal having a high reflectance, such as Ag, Al, Cu or Au, so that the reflective-type diffraction grating 107 can achieve a high efficiency. Particularly, Ag is advantageous from the viewpoint of the cost, and has a high reflectance while it has an absorption coefficient of about 5.1 with respect to a wavelength $\lambda 0$ (790 mm, which is the central wavelength in the design). Therefore, Ag can achieve a high reflectance with a very small thickness, and the lift-off can be easily carried out in the lift-off process. After the reflecting film material is formed, the lift-off is effected using an organic solvent and or a remover solvent, thereby the reflective-type diffraction grating 107 is formed. Although the pattern for the reflecting film 255 is formed by the lift-off process, it may be formed by a pattern formation method and a wet type etching method such as a spray etching method as used in the formation of the first bonding position-registration marker 244a. With respect to the etching method, dry etching may be used.

Figure 15A:
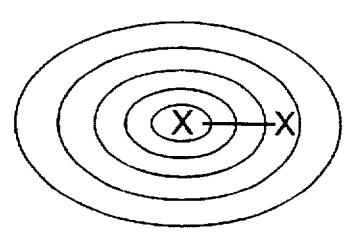
FIGS. 15a to 15d are views showing a method of forming a reflective-type NA conversion hologram element according to the present invention.
Figure 15B:
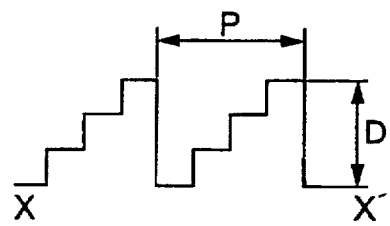
Figure 15C:
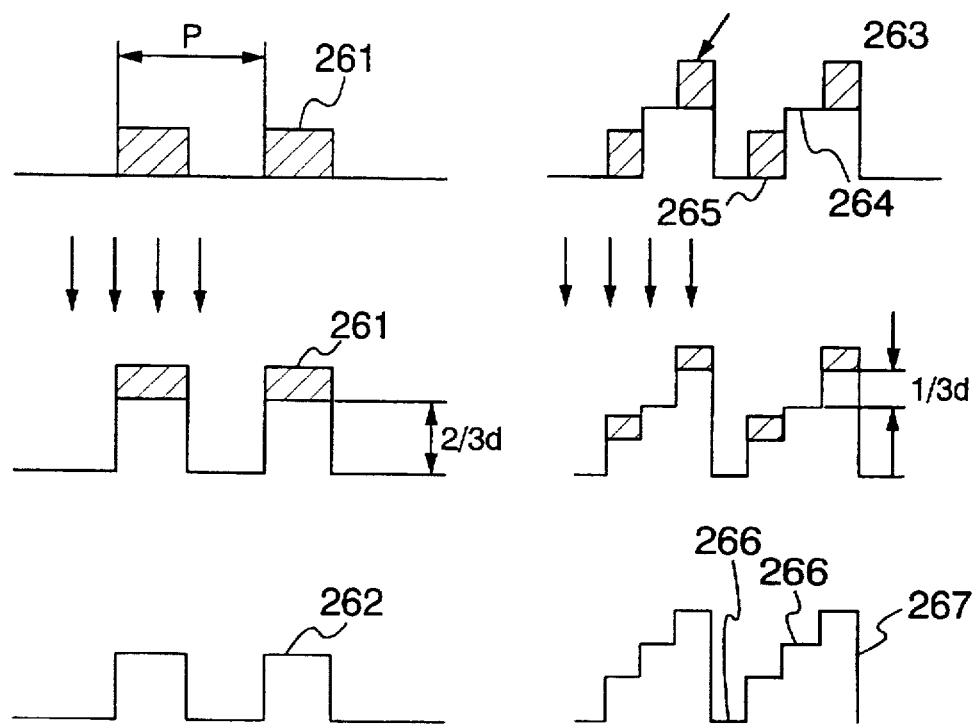

Next, a method of forming the NA conversion hologram 106 will be described with reference to FIGS. 15a to 15d. In this embodiment, in order to enhance the diffraction efficiency of the hologram 106, a 4-step hologram is formed. FIG. 15a is a front-elevational view of the 4-step hologram, and FIG. 15b is a cross-sectional view taken along the line X—X' of FIG. 15a. The 4-step configuration is formed by effecting a hologram pattern-forming step twice and a hologram pattern etching step twice. FIG. 15c shows a process flow for the formation of the 4-step hologram. In the first pattern formation, a 1st-step hologram pattern 261 is formed, having a duty ratio of 50/50 with respect to a 4-step hologram pitch P (hereinafter referred to merely as the "hologram pattern"). The 1stetching is effected by an amount which is about ⅔ of a final etching amount D. The etching is carried out by a method such as that described for the diffraction grating 107. After the etching is completed, the 1st-step hologram pattern 261 is removed by oxygen plasm asher or an organic solvent, and thereby a 1st-step hologram 262 is formed. A 2nd-step hologram pattern 263 is formed on the 1st-step hologram 262 which have been formed in the second pattern formation. The 2nd-step hologram pattern 263 is such that the duty ratio of 1st-step hologram line portions 264 of the 1st-step hologram 262 to 1st-step space portions 265 thereof is 50/50. The second etching is effected in an amount of about ⅓ of the final etching amount D. The etching is carried out by a method such as that described for the diffraction grating 107. After the etching is completed, the 2nd-step hologram pattern 263 is removed by oxygen plasma asher or an organic solvent, thereby forming a 2nd-step hologram 266. Further, the reflecting film 267 of the NA conversion hologram is formed, thereby forming the reflective-type NA conversion hologram 106 in the form of the 4-step hologram.

Figure 15D:
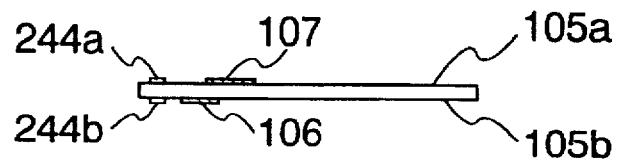

For the same reason described above for the reflective-type diffraction grating 107, the reflecting film 267 of the reflective-type NA conversion hologram is made of Ag. The reflecting film 267 made of Ag is formed by a lift-off process as described above for the reflecting film 255 of the reflective-type diffraction grating 107. FIG. 15d shows the reflective-type NA conversion hologram 106 formed on the second surface 105b of the first plate 241.

The reflective-type astigmatism-generating hologram 124 (FIG. 11) is a reflective-type, 4-step hologram, and is formed by a method such as that described above for the reflective-type NA conversion hologram 106, although the hologram 124 is different in pattern configuration from the hologram 106.

Figure 16A:
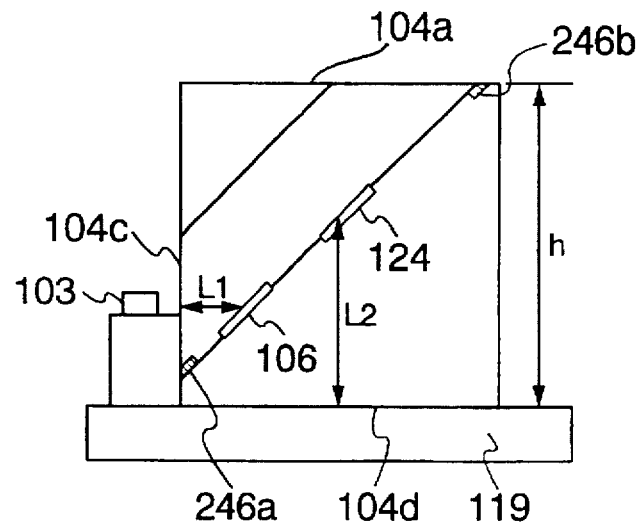
FIGS. 16a to 16d are views for enplaning a method of forming first and second depth markers according to the present the present invention.
Figure 16B:
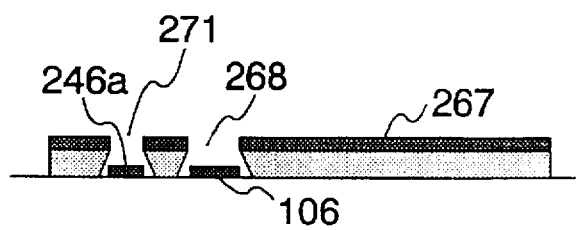
Figure 16C:
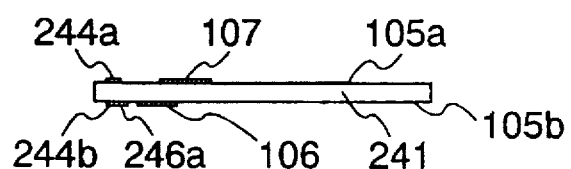
Figure 16D:
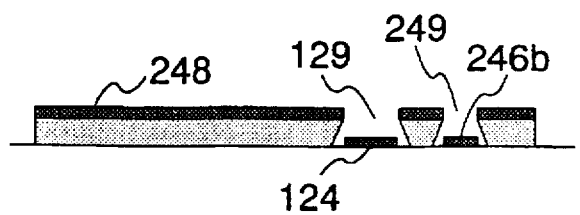

Next, a method of forming the first depth marker 246a and the second depth marker 246b will be described with reference to FIG. 16. The purpose of the first depth marker 246a is to accurately determine the distance L1 between the surface 104c and the reflective-type NA conversion hologram 106 at the final step of the process so as to accurately determine the distance between the semiconductor laser chip 103 (FIG. 16a) and the NA conversion hologram 106. Preferably, the first depth marker 246a and the reflective-type NA conversion hologram 106 are formed at the same time on the same surface, the first depth marker 246a is made of a material considerably different in refractive index from the first plate 241, and the amount of processing can be clearly determined during the processing. Here, the first plate 241 is formed of BK-7 having a refractive index of about 1.511, and therefore the first depth marker 246a is formed using the Ag material so as to form the reflecting film 267 of the reflective-type NA conversion hologram, at the same time when the reflecting film 267 is formed. Therefore, a first depth marker pattern 271 is formed on the mask on which the reflecting film pattern 268 of the reflective-type NA conversion hologram, and the first depth marker 246a is formed simultaneously with the formation of the reflecting film 267. FIG. 16b is a view showing a condition in which the first depth marker pattern 271 and the reflecting film pattern 268 of the reflective-type NA conversion hologram are formed, and the reflecting film 267 of the reflective-type NA conversion hologram is formed. FIG. 16c is a side-elevational view of the first plate 241 having the first depth marker 246a formed thereon. For similar reasons, the second depth marker 246b is formed simultaneously with the formation of a reflecting film 248 of the reflective-type astigmatism-generating hologram 124 (FIG. 11). The second depth marker 246b is provided for limiting the distance L2 between the reflective-type astigmatism-generating hologram 124 and the surface 104d of the sensor base plate 119. At the final step of the process, the distance up to the surface 104a is limited by the second depth marker 246b, and the optical guide member 104 has a final height has measured from the surface 104a. Therefore, a second depth marker pattern 249 is formed on the mask on which a reflecting film pattern 129 of the reflective-type astigmatism-generating hologram is formed, and the second depth marker 246b is formed simultaneously with the formation of the reflecting film 248 of the reflective-type astigmatism-generating hologram. FIG. 16d is a view showing a condition in which the second depth marker pattern 249 and the reflecting film pattern 129 of the reflective-type astigmatism-generating hologram are formed, and the reflecting film 248 of the astigmatism-generating hologram is formed. The first and second cutting markers 245a and 245b and the reflecting films 122 and 125 (FIG. 11) can be formed by a method such as that described above for the reflecting film 255 of the reflective-type diffraction grating.

Next, the formation of the first polarization beam splitter film 108 on the second surface 105b of the first plate 241 will be described. In this embodiment, the first polarization beam splitter film 108 is of the S polarized-light incident type, and has substantially 100% transmittance for the P polarized-light and a predetermined transmittance for the S polarized-light, and a relative phase difference between the S polarized-light and P polarized-light of the transmitted light must be substantially zero. Therefore, in general, the beam splitter film 108 having polarization selectivity is formed of a dielectric multi-layer film. The dielectric multi-layer film is made of such film materials that internal stresses, developing during the formation of the individual films by the materials, exhibit tensile stresses and compressive stresses and that the internal stresses of these films cancel each other in combination of the materials during the formation of the multi-layer film. Preferably, an expansion coefficient of the plate on which the multi-layer film is formed is generally in the middle of the range of expansion coefficients of the film materials to be combined together. In view of these points, it is necessary to prevent separation from occuring, the lowering of the precision of the plate, and cracks during the formation of the multi-layer film. In view of these requirements, typical examples of the combination are $TiO_2$/$SiO_2$, $Ta_2O_5$/$SiO_2$, $Al_2O_3$/$SiO_2$ and $ZnS$/$MgF_2$. In the design of the beam splitter film, a suitable combination is selected in accordance with the designed refractive index value. Particularly in this embodiment in which the angle of incidence is 45°, and the refractive index ng of the incident light is BK-7, the Brewster conditions can be satisfied by the combination of $Al_2O_3$/$SiO_2$, and reflection for the P polarized-light can be reduced to substantially zero, so that substantially 100% transmittance can be obtained. A formula for the Brewster conditions is as follows:

$$(ng)2=2\times(nh)2\times(nl)2/((nh)2+(nl)2) \qquad (4)$$

If ng=1.5111, nh (refractive index of $Al_2O_3$)=1.580 and nl (refractive index of $SiO_2$)=1.450, the formula (4) is satisfied. On the other hand, the optical film thickness relative to the design central wavelength λ0 is determined as follows:

$$nH \cdot L \times d = \lambda 0/(4 \times \cos \theta t)$$

θt represents the refractive angle to each thin film. The refractive angle can be determined by the following formula according to the Snell law:

$$ng \times \sin \theta 0 = nH \cdot L \times \sin \theta t$$

θ0 represents the angle of incidence. However, these film thickness determinations vary depending on the specification of reflectance of the S polarized-light, and also are adjusted in order to bring the relative phase difference between the S polarized-light and the P polarized-light to substantially zero. With these combinations, the beam splitter film can be formed without causing the reflection of the P polarized-light due to the film thickness precision at the film-forming stage. However, the design can be made using the above-mentioned combinations of the constituent materials. The first polarization beam splitter film 108 is formed by a lift-off process as described above for the reflecting film 255 of the reflective-type diffraction grating 107.

Figure 23A:
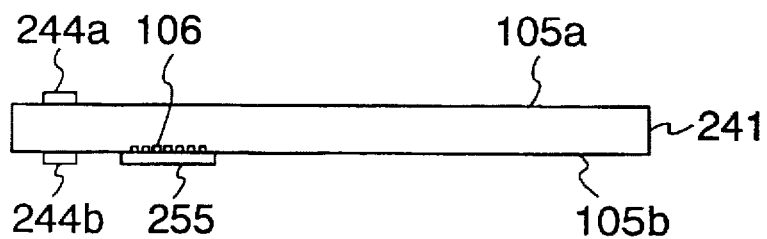
FIG. 23a to 23c are side-elevational views showing a method of forming a protective film according to the present invention.

The reflective-type NA conversion hologram 106 has already been formed on the second surface 105b of the first plate 241, and the reflecting film 255 made of Ag for the NA conversion hologram has been formed. When the first polarization beam splitter film 108 is to be formed by a lift-off process, the film formation is effected with such a pattern configuration that a protective film for the reflecting film 255 of the NA conversion hologram can also be formed. This formation method will be described with reference to FIGS. 23a to 23c. FIG. 23a is a side-elevational view showing a condition in which the first bonding position-registration marker 244a is formed on the first surface 105a of the first plate 241, the second bonding position-registration marker 244b is formed on the second surface 105b of the first plate 241, the NA conversion hologram 106 is formed, and the reflecting film 255 for this NA conversion hologram is formed.

Figure 23B:
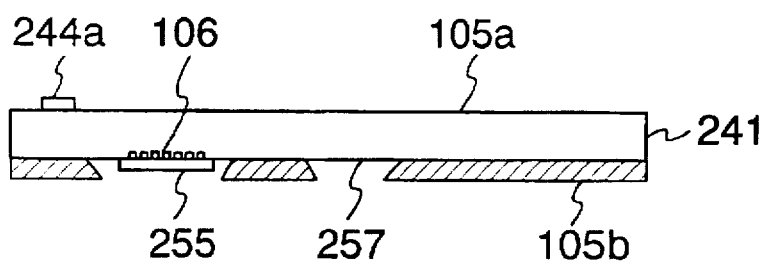

FIG. 23b is a side-elevational view showing a condition in which a lift-off pattern 257 for the first beam splitter film is formed in such a way that a protective film for the reflecting film 255 of NA conversion hologram can be formed.

Figure 23C:
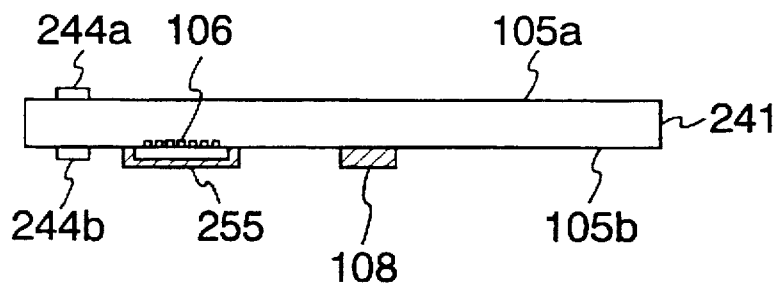

FIG. 23c is a side-elevational view illustrating the first plate 241 after the lift-off of the first polarization beam splitter film 108 formed by the vacuum vapor deposition.

Next, an explanation will be presented of the formation of the second polarization beam splitter film 116 on the second surface 105c of the second plate 242. The second polarization beam splitter film 116 is formed using a design technique and pattern formation technique as described above for the first polarization beam splitter film 108. That is, the second polarization beam splitter film 116 is formed by a method such as that described above for the first beam splitter film 108. The formation of this film 116 is carried out in such a manner that a protective film for the reflecting film 125 is formed at the same time.

Next, examples of the method of manufacturing the optical guide member 104 of the invention will be described with reference to FIGS. 17 to 22. FIG. 18 is a side-elevational view showing the plates before the assembly block is formed. By the above-mentioned optical function element-forming methods the first bonding position-registration marker 244a are formed on the first surface 105a of the first plate 241 of the first assembly block. The reflective-type NA conversion hologram 106, the first polarization beam splitter film 108, the reflective-type diffraction grating 107, the first depth marker 246a and the second bonding position-registration marker 244b are formed on the second surface 105b of the first plate 241. The reflecting film 122, the reflective-type astigmatism-generating hologram 124 and the third bonding position-registration marker 244c and the second depth marker 246b are formed on the first surface 105b of the second plate 242. The second polarization beam splitter film 116, the reflecting film 125 and the fourth bonding position-registration marker 244d are formed on the second surface 105c of the second plate 242. The fifth bonding position-registration marker 244e, the first cutting marker 245a and the second cutting marker 245b are formed on the first surface 105d of the third plate 243. The sixth bonding position-registration marker 244f is formed on the second surface 105a of the third plate 243. The seventh bonding position-registration marker 244g is formed on the first surface 105c of the polarization plane conversion plate 118, and the eighth bonding position-registration marker 244h is formed on the second surface 105d of the polarization plane conversion plate 118.

Figure 19:
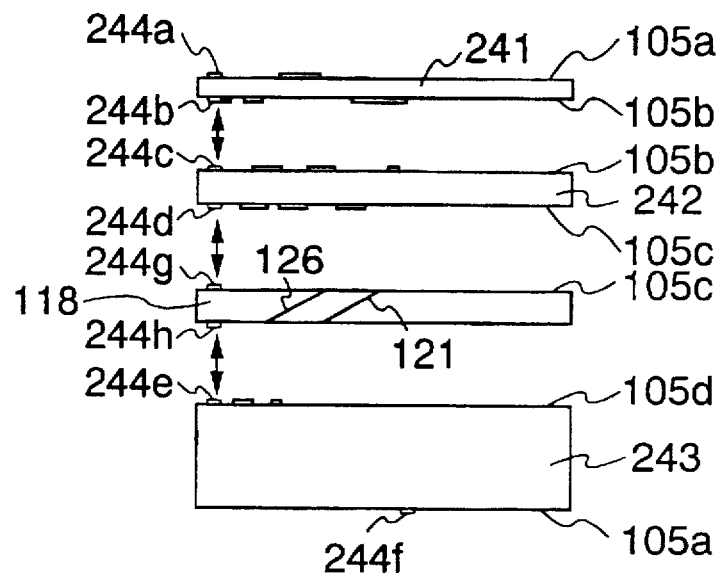
FIG. 19 is a view for enplaning the formation of the assembly block according to the present invention.
Figure 19:
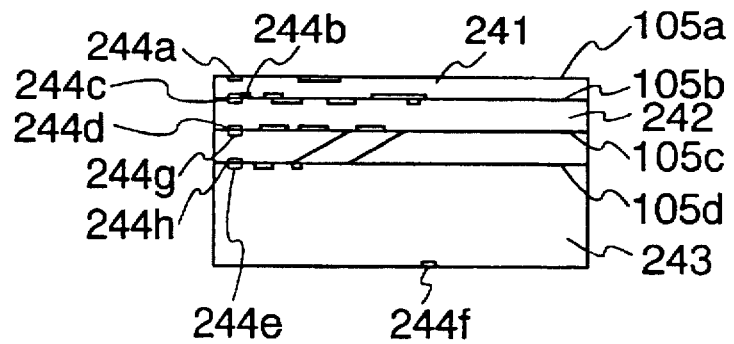

The method of forming the assembly block will be described with reference to FIG. 19. The first plate 241 and the second plate 242 are registered with each other, using the second and third bonding position-registration markers 244b and 244c, and then are bonded together. Similarly, the second plate 242, bonded to the first plate 241, and the polarization plane conversion plate 118 are registered with each other, using the fourth and seventh bonding position-registration markers 244d and 244g, and then are bonded together. Further, using the eighth bonding position-registration marker 244e and 244h, the third plate 243 is bonded to the polarization plane conversion plate 118 bonded to the first and second plates 241 and 242, thereby forming the first assembly block.

Figure 20A:
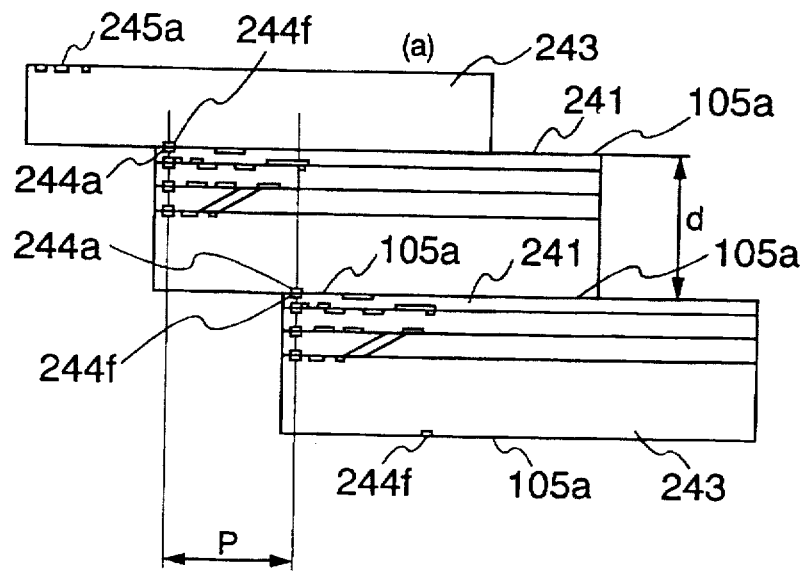
FIGS. 20a to 20c are views for enplaning the formation of the composite block according to the invention.
Figure 20B:
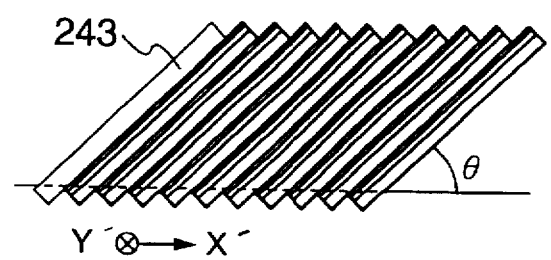
Figure 20C:
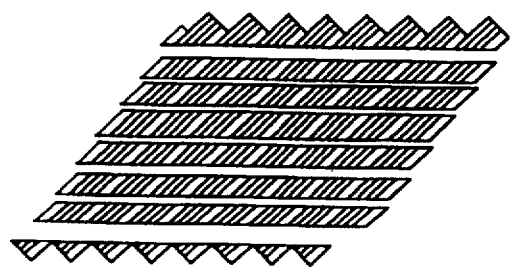

Next, a method of forming an assembly structure will be described with reference to FIGS. 20a to 20c. FIG. 20a is a view showing a method in which a plurality (n) of first assembly blocks mentioned above are prepared, using the first bonding position-registration marker 244a of one assembly block and the sixth bonding position-registration marker 244f of another assembly block, and then the two assembly blocks are bonded together. In this manner, a plurality (n) of assembly blocks are bonded together. As a result, the optical function elements on the first surface 105a of the first plate 241 of the assembly block are held against the third plate 243 of the adjacent assembly block. The third plate 243 is bonded to the outermost (nth) assembly block, using the first bonding position-registration marker 244a of this assembly block and the sixth bonding position-registration marker 244f of this third plate 243, thereby forming the assembly structure. FIG. 20b is a side-elevational view of the assembly structure.

Figure 17:
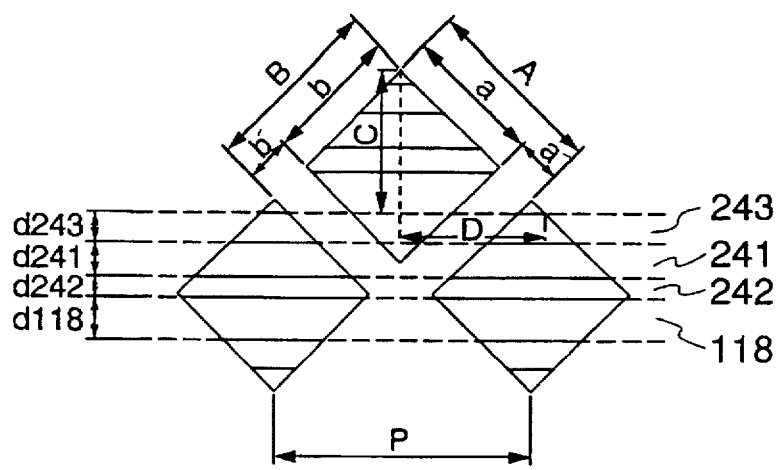
FIG. 17 is a view for explaining the formation of an assembly structure the invention.
Figure 18:
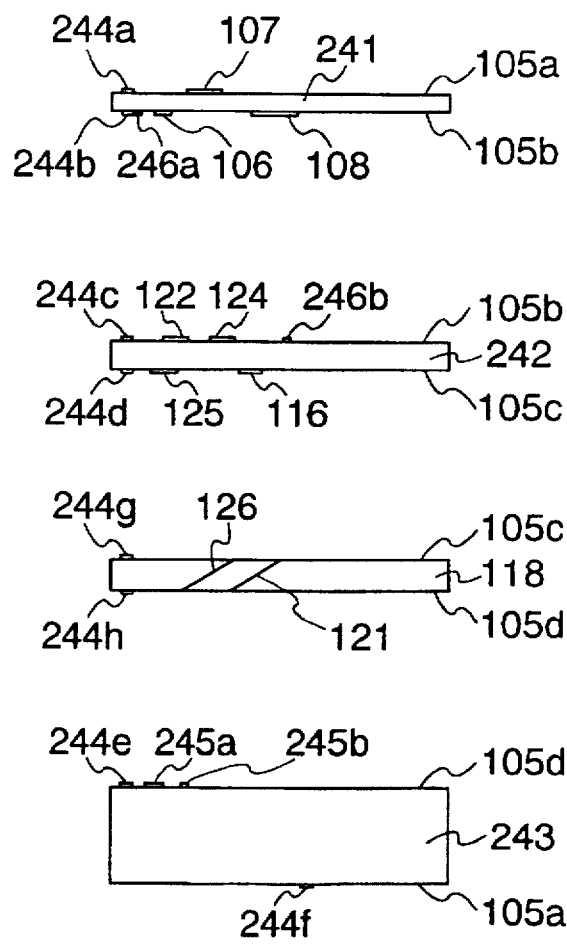
FIG. 18 is a side-elevational view showing plates of the optical pickup of the invention before the substrates are combined together.

FIG. 17 is a view explanatory of the method of forming the assembly structure. Broken lines in FIG. 17 denote interfaces of bonding between the plates, and FIG. 17 shows the positions of the elements in the layer structure in which each assembly block comprises the third plate 243, the first plate 241, the second plate 242 and the polarization plane conversion plate 118. In view of the processing cost and the simplification of the process, the same function elements are mounted on the same plates. More specifically, the elements (devices) in the assembly block need to be arranged parallel in a horizontal direction (FIG. 17), and also the elements need to be arranged parallel in a direction of 45° either right or left since the assembly blocks are to be cut in the direction of 45°. In order that opposite sides or faces of each of the elements (which are to be opposed to the face of the optical disk 110 and the sensor face, respectively) can be simultaneously subjected to processing (e.g. lapping) at the same time at a later step, the elements are arranged in the direction of 45° so as to expose these surfaces. With respect to the positional relation or arrangement of the elements more fully described later, a and b (FIG. 17) represent dimensions of the outer shape of the element in its final form, and a' and b' represent cutting margins in a cutting operation. The number of the elements produced from one assembly block is proportional to the cross-sectional area ratio (expressed by the following formula) of the area of the element to the area of the elements plus the cutting margins, and therefore the cutting margins a' and b' are made as small as possible.

Cross-sectional area ratio=a×b/(a+a')×(b+b')

The minimum values of these cutting margins depend on the sum of the thickness of the cutting blade (used for the cutting operation) and the amount of lapping for adjusting the dimensions after the cutting and for forming the cut surfaces into a mirror surface. Here, because of the condition of arrangement of the elements, a dimension C and a dimension D in FIG. 17 must be equal to each other, and therefore the value of a' and the thickness of the third plate 243 are directly determined by the following formula:

$$(d241 + d242 + d118 + d243) \times \sqrt{2} = a + a'$$

Here d241 represents the thickness of the first plate 241, d242 represents the thickness of the second plate 242, d118 represents the thickness of the polarization plane conversion plate 118, and d243 represents the thickness of the third plate 243. With respect to a practical method of determining a' and d243, preferably, d243 is determined while setting a' to its minimum cutting margin dimension, or in contrast a' is determined while setting d243 to "0" in order to simplify the construction. No limitation is imposed on b', and therefore it can be set to its minimum cutting margin dimension.

A method of forming the planar block will be described with reference to FIG. 20 and 21. FIG. 20a is a view showing a condition in which one assembly block is bonded to another assembly block in such a manner that they are offset by an amount P calculated from A and B in FIG. 17. The thickness of the assembly block is also determined by A and B. FIG. 20b is a view showing the external appearance of the assembly structure formed by bonding the plurality (n) of assembly blocks together. An inclination angle θ is the angle between the axis of the incident light and the bonding surfaces in the optical guide member of the invention, and is about 45° in this embodiment. A direction X' represents a direction inclined at the angle θ with respect to the bonding surfaces, and the planar block is cut out from the assembly structure in a plane X'–Y'. FIG. 20c is a view showing the external appearance of the thus cut-out planar blocks. FIG. 21a is a front-elevational view of the planar block cut from the assembly structure, and FIG. 21b is a side-elevational view thereof. The optical function elements mounted in the assembly blocks are arranged in the direction X', and the plurality of optical guide members of the invention are arranged in the cut-out planar block. FIG. 21c is an enlarged view of a portion (c) in FIG. 21a, and FIG. 21d is an enlarged view of a portion (d) in FIG. 21b. The second depth marker 246b is exposed to a first surface 285a of the planar block when the planar block is cut from the assembly structure. The second depth marker 246b serves to control the distance between the reflective-type astigmatism-generating hologram 124 and the first surface 285a of the planar block, and the first surface 285a is processed until a depth marker value DL1 reaches a predetermined value. Then, using the first surface 285a as a reference, a second surface 285b is processed until a predetermined device height h of the optical guide member of the invention is obtained. After the first and second surfaces 285a and 285b are thus processed, an anti-reflection film 286 for the designed central wavelength λ0 is formed on each of the first and second surfaces 285a and 285b. The anti-reflection film 286 is composed of a dielectric material. Here, a hard coating of $TiO_2/SiO_2$ is formed as the anti-reflection film 286 so that the film will not be damaged at a later grinding step. The anti-reflection film 286 is formed by a vacuum film-forming device.

Figure 22A:
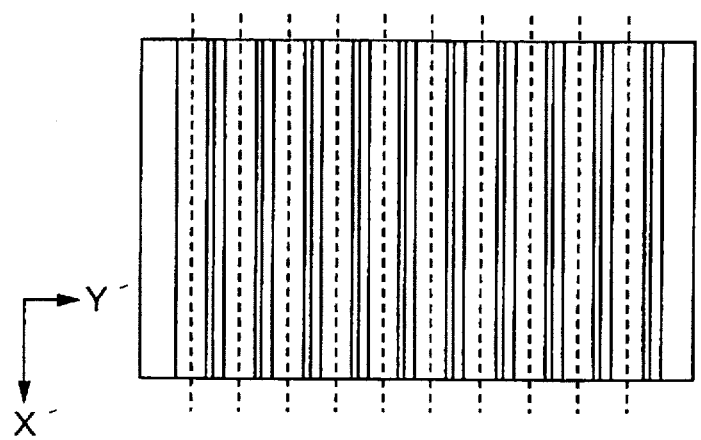
FIGS. 22a to 22d are views for explaining the formation of a bar block, as well as a final cutting process, according to the present invention.
Figure 22B:
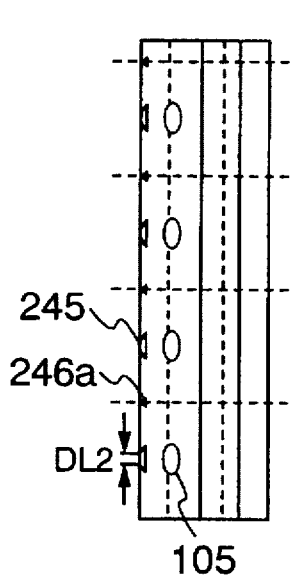
Figure 22D:
Figure 22C:
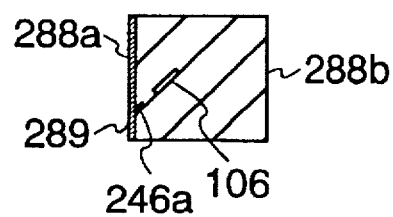

Next, the process of forming the bar blocks cut from the planar block will be described with reference to FIGS. 22a to 22d. FIG. 22a is a front-elevational view of the planar block, and FIGS. 22b and 22c are a front-elevational view and a side-elevational view of the bar block, respectively. The first depth marker 246a is exposed to a first surface 288a of the bar block when the bar block is cut from the planar block. The first depth marker 246a serves to control the distance between the reflective-type NA conversion hologram 106 and the first surface 288a of the bar block, and the first surface 288a is processed until a depth marker value DL2 reaches a predetermined value. Then, using the first surface 288a as a reference, a second surface 288b is processed until a predetermined device length L of the optical guide member of the invention is obtained.

After the first and second surfaces are thus processed, an anti-reflection film 289 for the designed central wavelength λ0 is formed on the first surface 288a. The anti-reflection film 289 is composed of a dielectric material. Here, a hard coating of $TiO_2/SiO_2$ is formed as the anti-reflection film 286 so that the film will not be damaged at a later grinding step. The anti-reflection film 286 is formed by a vacuum film-forming device.

Finally, using the first cutting markers 245 as a reference, the bar block is cut to provide optical guide members 104 of the invention. FIG. 22d shows the external appearance of a chip obtained by cutting.

What is claimed is:

1. An optical pickup comprising:

light-emitting means;

light-receiving means;

an integrated optical guide member having a plurality of inclined portions inclined with respect to light emitted from said light-emitting means;

a beam splitter film mounted on said optical guide member, and having polarization selectivity for splitting the light, incident on said beam splitter film, into transmitted light and reflected light; and condensing means for condensing the reflected light from said beam splitter film on an information recording surface of an optical disk;

wherein said light-receiving means is located in an optical path of the return light, and said light-receiving means is arranged in such a direction that the light can be incident perpendicularly to a direction of advance of the return light;

wherein the number of said inclined portions is not less than three; and wherein the light from said light-emitting means is reflected between two of said inclined portions so as to be directed to said optical disk.

2. An optical pickup according to claim 1, in which said optical guide member has a generally rectangular parallelopiped shape.

3. An optical pickup according to claim 2, in which said light-emitting means is opposed to a first surface of said optical guide member, and said light-receiving means is opposed to a second surface of said optical guide member located adjacent to said first surface, and the light is emitted from a third surface of said optical guide member toward said optical disk, said third surface being located adjacent to said first surface, and being opposed to said second surface.

4. An optical pickup according to claim 1, wherein the inclined portions have parallel surfaces at which the inclined portions are joined to one another so as to integrate all of the inclined portions.

5. An optical head according to claim 2, in which said optical guide member comprises a plurality of transparent substrates.

6. An optical pickup comprising:

light-emitting means;

light-receiving means;

an optical guide member having first, second, third and fourth parallel, inclined portions inclined with respect to light emitted from said light-emitting means, said optical guide member being defined by a block;

diffusion angle conversion means formed on said second inclined portion for converting a diffusion angle of that portion of the light which is emitted from said light-emitting means and which is incident on said diffusion angle conversion means;

reflecting means formed on said first inclined portion for reflecting the light converted in diffusion angle by said diffusion angle conversion means;

a first beam splitter film formed on said second inclined portion, and having polarization selectivity for splitting the light, reflected by said reflecting means, into transmitted light and reflected light;

condensing means for condensing the reflected light from said first beam splitter film on an information recording surface of an optical disk;

a second beam splitter film formed on said third inclined portion, and having polarization selectivity for splitting the light, returned from said optical disk and transmitted through said first beam splitter film, into transmitted light and reflected light;

a polarization plane conversion plate having a polarized light splitting portion provided between said third and fourth inclined portions for transmitting a P polarization component of the transmitted light from said second beam splitter film so as to direct said P polarization component to said light-receiving means while reflecting an S polarization component of said transmitted light, said polarization plane conversion plate having a reflecting surface for reflecting said reflected S polarization component so as to direct the same to said light-receiving means; and a focus error detection element formed on said second inclined portion for receiving the reflected light from said second beam splitter film;

wherein an incident light-splitting point of said polarized light splitting portion is located between the center of said optical guide member and said light-receiving means.

7. An optical pickup according to claim 6, in which said polarized light splitting portion is provided on such a surface that a polarization direction of the light, reflected by said optical disk and transmitted through said second beam splitter film, is inclined at an angle of about 45° with respect to a plane of incidence thereof.

8. An optical pickup according to claim 6, in which said diffusion angle conversion means is so designed as to satisfy the following formula; and said diffusion angle conversion means corrects the phase of a spherical wave sent from said beam splitter film to said condensing means;

$$0.18 < \sin \theta_1 < 0.30$$

$$0.06 < \sin \theta_2 < 0.17$$

where $\theta_1$ represents the diffusion angle of that portion of the light which is emitted from said light-emitting means and which is incident on said diffusion angle conversion means, and $\theta_2$ represents the diffusion angle of the light emanating from said diffusion angle conversion means.

9. An optical pickup according to claim 8, in which a hologram is used as said diffusion angle conversion means.

10. An optical pickup according to claim 9, in which said hologram is of the reflective type.

* * * * *